Patented Nov. 20, 1945

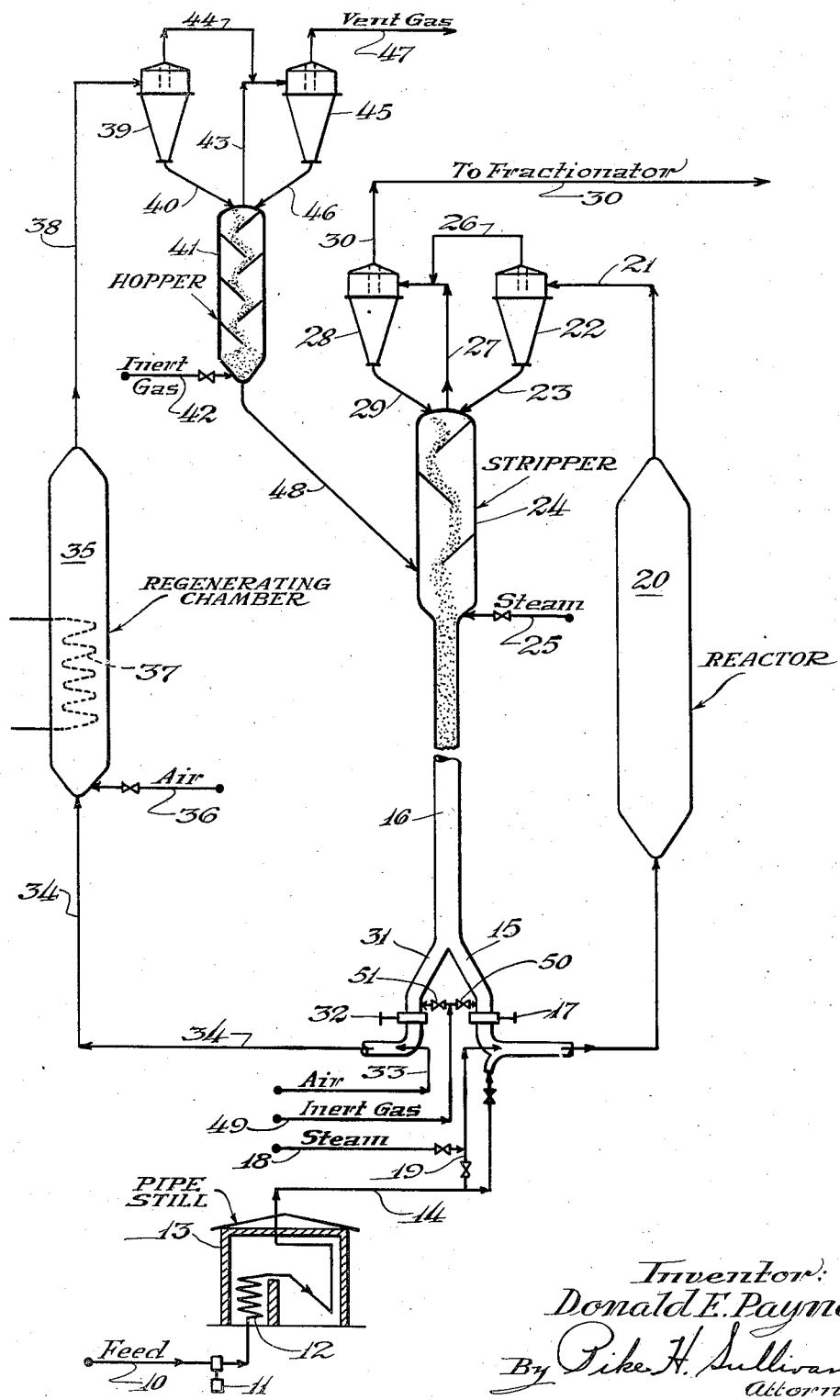

2,389,236

UNITED STATES PATENT OFFICE 2,389,236

CATALYTIC CONVERSION SYSTEM

Donald E. Payne, Chicago, Ill., assignor to Standard Oil Company, Chicago, Ill., a corporation of Indiana Application December 31, 1940, Serial No. 372,539

10 Claims. (Cl. 196—52)

This invention relates to catalytic conversion systems and it pertains more particularly to conversion systems of the so-called "fluid type" wherein a solid catalyst is employed for endothermic or exothermic reactions while suspended in an upwardly flowing gaseous or vapor stream. The invention is particularly directed to hydrocarbon conversion systems for the manufacture of high quality motor fuel.

In processes of catalytic cracking, hydrogenation, dehydrogenation, aromatization, reforming, isoforming, isomerization, alkylation, desulfurization, polymerization, etc. a hot vaporized hydrocarbon charging stock may be contacted with a solid catalyst while that catalyst is suspended in upwardly flowing reaction vapor stream. During the reaction the catalyst becomes coated with a carbonaceous deposit which impairs its catalytic activity. The coated catalyst may be separated from reaction vapors and suspended in another upwardly flowing stream containing controlled amounts of oxygen and thus regeneration may be effected by burning off the carbonaceous deposit while the catalyst is suspended in hot regeneration gas.

Important considerations in the catalytic conversion of hydrocarbons are the amount and the activity of the catalyst in the reaction zone. The activity of any particular catalyst is dependent upon the length of time said catalyst has been on-stream. A catalyst which is initially very active gradually loses its activity because of the carbonaceous material which becomes deposited on it during the course of the conversion. In a catalytic cracking process the relationship between the overall catalyst residence time and total amount of catalyst required for effecting desired conversion may be roughly expressed as follows:

$$T = at^{.534}$$

where T is tons of catalyst in the reactor per hundred barrels (42 gallons) of gas oil charged per hour, $t$ is overall catalyst residence time in minutes and $a$ is a constant ranging from about .3 to 3, for example about 1.2 for 40–45% conversion with active catalyst. For the isoforming of thermally cracked naphtha the same general formula applies but the constant, $a$, in this case will range from .05 to .005, preferably about .02. An object of my invention is to provide an improved method and means for obtaining this relationship between the amount of catalyst in the reactor and overall catalyst residence time.

The catalyst employed may be granular, powdered or pelleted solids of a particle size ranging from about 10 to 400 mesh, preferably about 200 to 400 mesh and preferably of fairly uniform size. When such catalyst is introduced at a fairly constant rate in the base of a vertical reactor wherein there is an upwardly flowing gas or vapor stream and the superficial velocity of said stream is varied it will be found that at high velocities the catalyst moves through the reactor at substantially the same velocity as the vapor stream, i. e., there is not a great tendency towards settling. At very low superficial vapor velocities through the reactor the catalyst may settle out of the vapors and assume a quiescent state. At intermediate vapor velocities the catalyst will be carried upwardly with the gas stream but there will be a pronounced tendency toward settling or slipping, i. e., the catalyst will move upwardly in the reactor at a much lower velocity than the supporting stream.

It has been found that with ordinary powdered catalyst ranging in particle size from about 200 to about 400 mesh the catalyst is uniformly distributed throughout the gas stream when the gas stream velocities are in excess of about 5 feet per second, the catalyst particles being suspended as individual particles in a continuous phase of gas. When the superficial gas velocity is decreased to about 2 feet per second the concentration of catalyst in the reactor rapidly increases and the catalyst takes on a "boiling" appearance in which "bubbles" of gas flow upwardly through a liquid like, "dense catalyst phase" in a manner similar to the upward flow of air through a body of water. This settled catalyst takes on the appearance of a new phase, an aerated catalyst phase, which may have a density of 10 to 20 pounds per cubic foot. This dense phase becomes more pronounced and more clearly defined as the gas velocity is further decreased but if the gas velocity is sufficiently decreased portions of the catalyst will become quiescent. In order to maintain a liquid like "dense phase" condition, the vapor velocity should be at least .2 foot per second and preferably about 1 to 2 feet per second. The velocity required for such dense phase conditions is dependent of course upon the particle size and weight of the catalyst, the diameter of the reactor and perhaps to some extent on the viscosity of the gas or vapor stream although the viscosity of this stream is not of as great significance as has heretofore been assumed.

It appears that when superficial vapor velocities in a reactor are so controlled as to produce a dense catalyst phase there is actually a rough interface between this lower dense catalyst phase and an upper rarefied phase. Apparently there is some force such as static electricity or surface energy which acts between closely adjacent particles and holds the powdered catalyst in the dense phase condition. The gas which bubbles through this dense phase sweeps catalyst particles therefrom into the upper gas phase and when such particles become dispersed therein they are subject to the laws of behavior as individual particles. With the introduction of catalyst into the dense phase at the same rate at which it is being removed from the top of the dense phase it is possible to maintain a constant level of catalyst in the reactor and to operate in a condition of dynamic equilibrium.

It might be assumed that with such low vapor velocities there would be a tendency toward classification, i. e., for the heavier catalyst particles to settle and escape withdrawal from the upper surfaces. It has been found, however, that with a superficial gas velocity of about ½ to 2 feet per second as much as 40% of 30 to 40 mesh particles can be added to the powdered catalyst without the occurrence of such classification. After equilibrium has been reached the heavier particles appear to be swept along in the eddies of relatively dense aerated catalyst and to be drawn from the surface of the dense phase at the same rate as they are being introduced thereto.

A very important feature of the dense phase operation is the uniform temperature which exists throughout all parts thereof. Here again the dense phase apparently behaves like a liquid in which there is sufficient turbulence and convection currents to obtain thorough and intimate mixing so that although gases may be introduced at a temperature of 950° F., the entire dense phase may be at a temperature that is very close to 925° F., when cracking is being effected in a dense phase reactor. Similarly, regeneration temperatures are uniform throughout the entire dense phase and relatively cold gases which are introduced with the oxygen may maintain any substantially uniform regeneration temperature by absorbing the exothermic heat as fast as it is liberated.

Heretofore fluid type conversion systems have been characterized by the following elements: reactor chamber, product-catalyst separation system and stripper, spent catalyst standpipe or catastat, regeneration chamber, regeneration gas-catalyst separator and hopper, and regenerated catalyst standpipe or catastat. The two standpipes or catastats in this system provided for the necessary pressure for introducing the spent and regenerated catalysts into the regenerator and reactor chambers respectively. An object of my invention is to simplify this conversion system by eliminating one of the catastats or standpipes without losing its function. A further object is to decrease investment and operating costs in a catalytic conversion system. A further object is to increase fluency and decrease any tendency toward bridging or plugging of material in catastats or standpipes. A further object is to provide an improved method and means for maintaining average catalyst activity at a desired level in the reaction chamber and for controlling temperatures in a regenerator. Other objects will become apparent as the detailed description of the invention proceeds.

In practicing my invention I introduce regenerated catalyst and stripped spent catalyst into one and the same standpipe or catastat and eliminate entirely the conventional second standpipe or catastat. My single catastat is not only less expensive than the two or more catastats heretofore required but it is highly advantageous because of its improved fluid flow characteristics. Catastats of small diameter have a greater tendency to become plugged and require higher vapor velocities for the aerating gases necessary for maintaining catalyst in fluent condition. The single large diameter catastat requires less insulation. Heat losses to the surrounding atmosphere are less with a single catastat than with a plurality of small catastats. Furthermore, by blending regenerated catalyst with spent catalyst there is a decreased tendency toward catalyst agglomeration and an improved catalyst fluency which is of great importance in a conversion system of this type.

From the base of the single catastat one stream of catalyst flows to the reactor and another stream to the regenerator. In catalytic cracking systems these streams may be of approximately equal size or from 1/10 to ten times as much catalyst may be charged to the reaction zone as is charged to the regenerator. For the isoforming of thermally cracked naphtha the amount of catalyst charged to the conversion chamber may be 100 times or more larger than the amount charged to the regenerator.

As above pointed out, the amount of catalyst in the reactor for any given conversion is dependent on catalyst activity which, in turn, is dependent upon overall catalyst residence time. The overall catalyst residence time in the reactor is the length of time that an average particle of catalyst is in the reactor between regeneration steps. In systems wherein all of the catalyst is regenerated before it is returned to the reactor the overall residence time is the same as the once-through catalyst holding time. In catalyst recycling operations as employed in the present invention the overall catalyst residence time is the sum of the once-through holding times of an average catalyst particle between regeneration steps. Thus if the once-through holding time is about three minutes and only about 10% of the catalyst is by-passed for regeneration, an average catalyst particle may make about ten passes of three minutes each through the reaction chamber between regeneration steps giving an overall residence time of about thirty minutes. On the other hand, if 90% of the catalyst is by-passed for regeneration an average catalyst particle will make about 1.1 passes of three minutes each through the reaction chamber between regeneration steps giving an overall residence time of about 3.3 minutes. A conversion in which only 10% of the catalyst is recycled for regeneration may require three or four times as much catalyst in the reactor as would be required for effecting the same conversion when 90% of the catalyst is recycled to the regenerator.

On the regeneration side the amount of carbon that must be burned from a given amount of catalyst is dependent upon the relative amount of catalyst recycled to the regenerator. By charging ten times as much catalyst to the regenerator as is charged to the reaction chamber, I provide a large mass of catalyst for absorbing the heat liberated by the combustion of carbonaceous material from the relatively small amount of spent catalyst in the recycled stream. In such operations almost all of the heat of regeneration may be absorbed by the catalyst itself. When this catalyst is admixed with spent catalyst in the single catastat the regenerated catalyst is partially cooled and the spent catalyst is partially heated. This is advantageous from the conversion standpoint because the regenerated catalyst is cooled to sufficiently low temperatures to avoid undue thermal decomposition when charging stock vapors are contacted therewith en route to the reactor. It is advantageous from the regeneration standpoint because the spent catalyst is preheated to ignition temperatures before it is recycled to the regenerator.

When long overall catalyst residence times are permissible in catalytic conversion operations and a very small amount of catalyst is recycled to the regenerator, there will be a relatively larger amount of carbon per unit quantity of catalyst charged thereto and in this case the heat of regeneration may be absorbed by extraneous fluids which may be circulated in or around the regenerator for the purpose of temperature control.

In addition to low cost and simplicity of operation, my improved system provides a remarkable degree of flexibility. In commercial operations where the activity of the catalyst, charging stocks, desired degree of conversion, etc. and even the very nature of the process may vary from time to time, it is highly advantageous for a refiner to effectively utilize such catalyst, charging stocks, processes, etc. in one and the same apparatus. In accordance with my invention this can be accomplished by the simple expedient of varying the amounts of catalyst which are charged to the reactor and regenerator respectively, from the base of the single catastat.

The invention will be more clearly understood from the following detailed description read in conjunction with the accompanying drawing which forms a part of this specification and which is a schematic flow diagram of a preferred embodiment of the invention.

Since the very object of the invention is to provide a system of such flexibility that it may be employed for a wide variety of processes it is obvious that the invention is not limited to any particular process. For the purpose of illustration I will describe its application to a system of catalytic cracking for the conversion of gas oil into high quality motor fuel by means of a powdered catalyst of the silica-alumina type. Such catalyst may be prepared by acid treating bentonite or by depositing magnesia, alumina or alumina and zirconia either in or on silica gel. No invention is claimed in any catalyst per se.

The cracking catalyst may have a particle size of about 200 to 400 mesh and may have an apparent bulk density before aeration of about .7, i. e., of about 40 to 50 pounds per cubic foot. When aerated the catalyst may have a bulk density ranging from about 20 to 30 pounds per cubic foot and in the reactor or regenerator the upward vapor or gas velocity is so regulated as to provide a catalyst density of about 1 to 35 pounds per cubic foot, preferably about 10 to 20 pounds per cubic foot.

Gas oil from line 10 is introduced by pump 11 through coils 12 of pipe still 13 to transfer line 14. The gas oil is vaporized and heated in the pipe still coils to give a transfer line temperature of about 900 to 1050° F., preferably about 950° F. at a transfer line pressure of about atmospheric to 50 pounds, preferably about 15 pounds per square inch. Powdered catalyst from branch 15 of catastat or standpipe 16 is introduced into transfer line 14 in amounts regulated by star feeder or valve means 17. The catalyst is preferably at a slightly higher temperature than the heated oil vapors but at a sufficiently low temperature to avoid undue thermal decomposition. Catalyst temperatures at this point may range from about 925 to 1075° F., and it is preferably introduced into the vapor stream at a temperature of about 975°–1000° F. I may employ a catalyst-to-oil weight ratio in the stream introduced into the reactor of about 1:1 to 10:1, preferably of about 5:1.

Steam in amounts up to 10 or 15% by weight based on stock charged may be introduced through line 18 for injecting the powdered catalyst into transfer line 14. Alternatively, some or all of the charging stock vapors may be by-passed through line 19 to serve as the catalyst injection media. The catalyst laden vapor stream is then introduced into reactor 20, although the vapors may be introduced at the base of the reactor and the catalyst may be separately introduced thereto.

The reactor is preferably a large cylindrical vessel provided with a cone shaped bottom and it is of such size as to contain the necessary amount of catalyst to effect the desired conversion and such cross-sectional area as to provide for a vertical vapor velocity of about .3 to 3 feet or more per second, preferably about 1½ to 2 feet per second. Where $\tfrac{1}{10}$ of the catalyst from catastat 16 is introduced into the reactor and $\tfrac{9}{10}$ is sent to a regenerator, the reactor may contain for example about 2 or 3 tons of catalyst per hundred barrels of stock charged per hour. On the other hand, when about 90% of the catalyst from catastat 16 is charged to the reactor and only about 10% to the regenerator, the amount of catalyst in the reactor should be larger, for example about 7 or 8 tons per hundred barrels of charging stock per hour. Under the preferred conditions hereinabove described, the catalyst density in the reactor should be about 1 to 35, preferably about 10 to 20 pounds per cubic foot. The vapor residence time in the reactor may be 2 to 40 seconds or more and the once-through catalyst holding time may range from a few seconds to an hour or more but is preferably about 1 to 5 minutes. The temperature in the reactor may be about 25 degrees lower than the mixed catalyst oil transfer line temperature, i. e., about 800 to 1000° F., preferably about 900° F. to 925° F. The amount of catalyst which should be present in the reactor will be determined by the extent of conversion desired and the overall residence time as previously described.

Reaction vapors carry catalyst from the top of the reactor 20 at the same rate at which catalyst is introduced into the base thereof. This catalyst-vapor mixture is introduced by line 21 into cyclone separator 22 from the base of which spent catalyst falls through conduit 23 to stripper 24. An inert stripping gas such as steam is introduced through line 25 at the base of the stripping column. Reaction vapors leave cyclone separator 22 through line 26 and these vapors, together with stripping gases from line 27, are introduced into cyclone separator 28 from which the remaining catalyst particles are returned to the stripper through conduit 29. The vapors from separator 28 are conveyed by line 30 to a conventional fractionation system for separating a gasoline fraction from lighter and heavier products. It should be understood that any catalyst-vapor separation means may be employed instead of or in conjunction with the cyclone separators hereinabove described and that any number of cyclone separators may be employed either in series or in parallel for effecting the catalyst-vapor separation.

The stripped spent catalyst is discharged into the catastat 16. A portion of the catalyst from the base of this catastat is withdrawn through branch line 31 in amounts regulated by star feeder or slide valve 32 and is injected by air from line 33 through line 34 to regenerating chamber 35. Alternatively, this catalyst may be directly introduced into the regenerating chamber by any other suitable means and the air or other oxygen-containing gas may be introduced at the base of this chamber through line 36. This regenerating chamber is similar in construction to reactor 20 and is designed to provide for a catalyst residence time sufficient to permit the combustion of carbonaceous materials. The catalyst density in the regenerator may be controlled by vapor velocity therein and here again I prefer to employ such gas velocities as will provide catalyst densities of about 1 to 35 pounds per cubic foot, preferably about 15 to 20 pounds per cubic foot. Such gas velocities in this case may range from about .3 to 3 or more feet per second and are preferably about 1½ to 2 feet per second.

If 90% of the catalyst from catastat 16 is introduced through line 31 to the regenerator it may be unnecessary to provide for extraneous temperature control means therein but I prefer to employ pancake coils 37 or the like for circulating a heat exchange fluid such as a fused salt mixture, mercury, molten metal alloy, oil, steam, or any other suitable fluid for maintaining regeneration temperatures within safe limits. For silica-alumina type catalysts I prefer to avoid temperatures in excess of 1050 to 1100° F. but the safe limit will, of course, depend upon the particular catalyst employed.

Regenerated catalyst is carried from the top of chamber 35 through line 38 to cyclone separator 39 from which the regenerated catalyst passes through conduit 40 to hopper or stripper 41. An inert aerating or stripping gas is introduced at the base of this hopper 42 and it is discharged from the top of the hopper 43. These stripping gases together with gases leaving separator 39 through line 44 are introduced into cyclone separator 45 wherein residual catalyst material is knocked out and returned through conduit 46 to column 41. Regeneration gases from separator 45 are withdrawn through line 47 through suitable waste heat boilers, turbines or other conventional systems for recovering energy therefrom.

Regenerated catalyst from the base of column 41 is introduced through line 48 to stripping column 24 or to the top of catastat 16. In cases where the amounts of oxygen-containing gases in the regenerated catalyst are unobjectionable, stripper column 41 may be eliminated and the catalyst from conduits 40 and 46 may be introduced directly into stripping column 24 or into catastat 16. This catastat is preferably about 50 to 100 feet high and may be about 3 or 4 feet in diameter depending, of course, upon the size of the installation. Catalyst is maintained in fluent condition in this catastat by means of an inert gas such as steam or preheated tail gases from the fractionation system, which gases may be introduced through line 49 and branch lines 50 and 51. The amount of aeration gases should be such as to maintain the catalyst in fluent or liquid like form and of such density as to provide the necessary pressure head at the base of the catastat. For obtaining densities of about 20 to 30 pounds per cubic feet I employ gas velocities of about .05 to .2 feet per second in the catastat.

While I have described in detail a preferred embodiment of my invention it should be understood that the invention is not limited to the particular operating conditions or the particular process hereinabove described nor is it limited to the particular embodiment illustrated in the drawing since many modifications and equivalent structures will be apparent to those skilled in the art from the above description.

I claim:

1. A catalytic conversion system which comprises a reaction chamber, a product-catalyst separation system, a standpipe for pressuring aerated catalyst, means for introducing an aerating gas in regulated amounts at the base of said standpipe, means for discharging gases from the top of said standpipe, a regeneration chamber, a regeneration gas-catalyst separation system, means for introducing catalyst from the base of said standpipe into said reactor, means for introducing catalyst and vapors from the reactor to said product-catalyst separation system, means for introducing catalyst from said separation system to said standpipe, means for introducing another portion of catalyst from the base of said standpipe together with an oxygen-containing gas into said regeneration chamber, means for passing regenerated catalyst and gases from the regeneration chamber to the regeneration gas-catalyst separation system and means for introducing regenerated catalyst from said last named system to said standpipe.

2. In a catalytic conversion system of the fluid type wherein catalyst is suspended in vapor and gaseous streams in conversion and regeneration zones respectively, the method of operation which comprises introducing partially spent catalyst from the conversion zone and regenerated catalyst from the regeneration zone into the top of a single column of such height and density as to provide the necessary pressure for introducing catalyst into the conversion and regeneration zones, introducing an aerating gas at the base of said column and passing said gas upwardly therethrough at such a rate as to maintain the catalyst in fluent form and to maintain a catalyst density in said column within the approximate range of 20 to 40 pounds per cubic foot introducing one stream of catalyst from the base of said column to said conversion zone and introducing another stream from the base of said column to said regeneration zone.

3. The method of claim 2 wherein the process is the catalytic cracking of heavy hydrocarbons such as gas oil and wherein about 10 to 90% of the catalyst is introduced from the base of the column to the conversion zone and the remainder of the catalyst is introduced into the regeneration zone.

4. The method of claim 2 wherein the conversion process comprises the conversion of thermally cracked naphtha and wherein at least one hundred times as much catalyst is introduced from the base of the column to the conversion zone as is introduced from the base of the column to the regeneration zone.

5. In a catalytic hydrocarbon conversion system of the fluid type wherein solid catalyst is suspended in vapor and gas streams in conversion and regeneration zones respectively, reaction products are separated from partially spent catalyst and regenerated catalysts are separated from regeneration gases, the method of operation which comprises admixing separated partially spent catalyst with separated regenerated catalyst at the top of a single pressure column, aerating catalyst in said column at such a rate as to maintain said catalyst in fluent form and to maintain a catalyst density in said column within the approximate range of 20 to 40 pounds per cubic foot introducing a part of the catalyst mixture from the base of said column to the regeneration zone and introducing another part of the catalyst from the base of said column to the conversion zone.

6. The method of claim 5 which includes the step of maintaining an amount of catalyst and an overall catalyst residence time in the conversion zone in accordance with the following equation:

$$T = at^{.534}$$

where T is tons of catalyst in the reaction zone per hundred barrels of charging stock per hour, t is overall catalyst residence time in minutes and a is a constant ranging from .3 to 3.

7. The method of claim 5 which includes the step of maintaining an amount of catalyst and an overall catalyst residence time in the conversion zone in accordance with the following equation:

$$T = at^{.534}$$

where T is tons of catalyst in the reaction zone per hundred barrels of charging stock per hour, t is overall catalyst residence time in minutes and a is a constant ranging from .005 to .05.

8. Method of operating a catalytic hydrocarbon conversion system which comprises maintaining a column of a mixture of partially spent catalyst and regenerated catalyst, aerating said catalyst to maintain it in fluent form and to maintain a catalyst density in said column within the approximate range of 20 to 40 pounds per cubic foot vaporizing and preheating a hydrocarbon charging stock to reaction temperature, introducing a portion of the mixed catalyst from the base of said column together with said stream of hot vaporized charging stock into a conversion zone, maintaining a temperature in said conversion zone of about 800 to 1000° F. and an amount of catalyst in said zone sufficient to produce the desired conversion, separating reaction products from partially spent catalyst discharged from said conversion zone, returning the separated catalyst to the top of said column, introducing another portion of the mixed catalyst from the base of said column to a regeneration zone together with an oxygen-containing gas, separating regeneration gases from the regenerated catalyst discharged from said regeneration zone and returning said separated regenerated catalyst to the top of said column for admixture with partially spent catalyst.

9. The method of claim 8 which includes the step of aerating the column at a vertical gas velocity of about .05 to .2 feet per second.

10. The method of claim 8 wherein the temperature of the catalyst introduced into the reaction zone is higher than that of the hot vaporized charging stock with which it comes into contact.

DONALD E. PAYNE.